(12) United States Patent
Creasey (10) Patent No.: US 11,245,570 B2
(45) Date of Patent: Feb. 8, 2022

(54) REMOTE DATA PUBLISHING (71) Applicant: Itron, Inc., Liberty Lake, WA (US)

(72) Inventor: Wayne Creasey, Colbert, WA (US)

(73) Assignee: Itron, Inc., Liberty Lake, WA (US)

( * ) Notice: Subject to any disclaimer, the term of this patent is extended or adjusted under 35 U.S.C. 154(b) by 17 days.

(21) Appl. No.: 16/290,532

(22) Filed: Mar. 1, 2019

(65) Prior Publication Data

US 2020/0280480 A1 Sep. 3, 2020

(51) Int. Cl.
*H04L 12/24* (2006.01)
*H04L 29/08* (2006.01)
*H04L 29/06* (2006.01)

(52) U.S. Cl.
CPC .......... *H04L 41/069* (2013.01); *H04L 65/607* (2013.01); *H04L 65/80* (2013.01); *H04L 67/26* (2013.01); *H04L 69/18* (2013.01)

(58) Field of Classification Search
CPC ..... H04L 41/069; H04L 65/607; H04L 65/80; H04L 67/26; H04L 69/18
See application file for complete search history.

(56) References Cited

U.S. PATENT DOCUMENTS

| | | | | |
|---|---|---|---|---|
| 8,364,846 B2* | 1/2013 | Vaswani | ........... | H04L 29/12915 709/245 |
| 8,378,848 B2* | 2/2013 | Young | ............ | G01D 4/002 340/870.07 |
| 10,298,611 B1* | 5/2019 | Caldwell | ............... | H04L 63/029 |
| 2008/0186202 A1* | 8/2008 | Vaswani | ............. | H04L 61/2061 340/870.03 |
| 2010/0070099 A1* | 3/2010 | Watson | ................... | F25D 21/04 700/295 |
| 2012/0216123 A1* | 8/2012 | Shklovskii | ......... | G06Q 30/0201 715/738 |
| 2013/0009787 A1* | 1/2013 | Ree | ........................ | H04W 4/20 340/870.02 |
| 2013/0030733 A1* | 1/2013 | Hanley | .................... | H04Q 9/00 702/62 |
| 2013/0294237 A1* | 11/2013 | Osterloh | ................ | G06Q 50/06 370/235 |
| 2014/0094199 A1* | 4/2014 | Palanki | ................... | G01S 19/05 455/456.5 |
| 2014/0167976 A1* | 6/2014 | Barrett | ................... | G01D 4/004 340/870.02 |

(Continued)

*Primary Examiner* — William G Trost, IV
*Assistant Examiner* — Monishwar Mohan
(74) *Attorney, Agent, or Firm* — Lee & Hayes, P.C.

(57) ABSTRACT

Techniques for publishing data that is generated outside a service provider to a data store that is located within the service provider are described. For example, a device may implement a first communication protocol to provide a service. The device may generate log data and/or metric data indicating an event that occurred while performing the service, such as a time when an operation was performed, an error that occurred, a number of errors that have occurred, etc. The device may provide the log data and/or metric data to the service provider, which may implement a second communication protocol or otherwise be associated with a different environment. The service provider may store the log data and/or metric data in the data store that is associated with the service provider. Such process may be repeated for any number of devices that operate separately from the service provider.

20 Claims, 5 Drawing Sheets

(56) References Cited

U.S. PATENT DOCUMENTS

| | | | | |
|---|---|---|---|---|
| 2014/0344430 A1* | 11/2014 | Ayanam | ............... | H04L 41/0213 |
| | | | | 709/223 |
| 2015/0137703 A1* | 5/2015 | Hartman | ................. | H02J 7/00 |
| | | | | 315/294 |
| 2015/0156031 A1* | 6/2015 | Fadell | ................. | G08B 19/005 |
| | | | | 700/276 |
| 2016/0147243 A1* | 5/2016 | Micali | ................. | G01R 21/133 |
| | | | | 700/295 |
| 2017/0105369 A1* | 4/2017 | Shamley | ................. | G01D 4/004 |
| 2017/0352245 A1* | 12/2017 | Maher | ................. | G08B 21/182 |
| 2019/0004587 A1* | 1/2019 | Van Wyk | ............... | H04W 40/20 |
| 2019/0007186 A1* | 1/2019 | Nguyen | ................. | H04L 1/203 |
| 2019/0007333 A1* | 1/2019 | Monier | ............... | H04L 47/6275 |
| 2019/0007902 A1* | 1/2019 | Khaled | ............... | H04W 52/0216 |
| 2019/0074007 A1* | 3/2019 | Torpy | ..................... | G10L 15/26 |
| 2019/0079818 A1* | 3/2019 | Handa | ................. | G06F 11/0778 |
| 2019/0165964 A1* | 5/2019 | Bartier | ................... | H04L 69/26 |
| 2019/0390977 A1* | 12/2019 | Frader-Thompson | ...................... | |
| | | | | G01D 4/002 |
| 2020/0005404 A1* | 1/2020 | Patterson | ............. | G06F 9/4411 |

\* cited by examiner

```
                    ┌──────────────────────────────┐
                    │                              │
                    │  PERFORM A SECOND SERVICE 308│
                    │                              │
                    └──────────────┬───────────────┘
                                   │
                                   ▼
          ┌──────────────────────────────────────────────┐
          │ GENERATE SECOND SERVICE DATA COMPRISING      │
          │ AT LEAST ONE OF A SECOND SERVICE LOG OR A    │
          │ SECOND SERVICE METRIC REGARDING THE          │
          │ SECOND SERVICE 310                           │
          └──────────────────────┬───────────────────────┘
                                 │
                                 ▼
          ┌──────────────────────────────────────────────┐
          │ SEND, TO THE SERVICE PROVIDER AND/OR         │
          │ USING THE LIBRARY, A SECOND MESSAGE THAT     │
          │ INCLUDES THE SECOND SERVICE DATA 312         │
          └──────────────────────────────────────────────┘
```

REMOTE DATA PUBLISHING

BACKGROUND

Different computing environments may need to provide data to one another but may not be configured to communicate with one another due to various network constraints, such as firewalls, security policies, network rules, software updates, etc. As an example, cloud environments offer many advantages, such as providing various computer resources that are configurable to accomplish a task. However, in some cases, different programs and/or applications that operate within cloud environments may not support the same communication protocols due to the function of the programs and/or applications or when the programs and/or applications were created. For example, in a utility architecture, a utility service may be implemented, such as on premises at a utility, to manage resources, such as water, gas, electricity, etc. In particular, the utility service may receive resource consumption data from utility nodes and/or process the resource consumption data. The utility service may communicate with the utility nodes according to a particular communication protocol, such as Internet Protocol version 6 (IPv6). In contrast, a service provider that is in communication with the utility service may operate according to a different communication protocol, such as Internet Protocol version 4 (IPv4). These incompatible communication protocols make it inefficient or sometimes impossible for the utility service to collect data pertaining to the utility nodes and provide the data to the service provider. For example, the utility service may maintain log data locally while managing resource consumption data. Due to network constraints (e.g., firewalls, security policies, network rules, etc.), such log data is not made available to services within the cloud environment.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes techniques for publishing data that is generated outside a service provider (e.g., at a utility service, utility node, etc.) to a data store that is located within the service provider. For example, a remote device may implement a first communication protocol to provide a service, such as communicating with utility nodes to receive resource consumption data, providing the resource consumption data to the service provider, or any other service. The remote device may generate log data and/or metric data indicating an event that occurred while performing the service, such as a time when an operation was performed, an error that occurred, a number of errors that have occurred, etc. The remote device may use a library of functions and/or objects to provide the log data and/or metric data to a message service, which may implement a second communication protocol or otherwise be associated with a different environment. The message service may store the log data and/or metric data and receive a request from the service provider, which may implement a third communication protocol or otherwise be associated with a different environment, to send the log data and/or metric data. The service provider may store the log data and/or metric data in the data store that is associated with the service provider. Such process may be repeated for any number of remote devices that operate separately from the service provider. The service provider may process data stored in the data store to evaluate problems with the remote devices (e.g., troubleshoot), identify issues occurring at the remote devices, provide notifications regarding performance of the remote devices, etc. As such, the techniques may allow log data, metric data, and/or other data generated at various remote devices to be stored at a central location for processing.

In one illustration, a utility service may be implemented by a first device and may be in communication with a service provider. The utility service may perform various operations to manage resources. For example, the utility service may receive resource consumption data from utility nodes and/or process the resource consumption data. The utility service may communicate with the utility nodes according to a particular communication protocol, such as IPv6, IPv4, or another protocol. The utility service may generate log data and/or metric data regarding operations performed by the utility service. For example, the log data may indicate an error that has occurred while performing operations, a time when resource consumption data was received, a time when an operation was performed, an exception that occurred while performing an operation, etc. The metric data may indicate a number of errors that have occurred, a number of transactions (e.g., operations) that have been performed, etc.

The utility service may then use a library of functions or objects to provide the log data and/or the metric data to a service provider. For example, the utility service may use the library to generate a message for the log data and/or the metric data that is formatted for use by the service provider. Further, the utility service may use the library to send the message to the service provider. The message may be sent according to a communication protocol that is determined by the library and compatible with a message service and/or service provider In a similar fashion, any number of additional services or devices may implement the library to provide log data and/or metric data to the service provider regarding a service that is performed by the respective service. Each additional service may be another utility service and/or any other service that operates separately from the service provider.

The service provider may receive a message from the utility service and/or the message service. The service provider may analyze the message to determine if the message includes a particular type of data, such as a predetermined type of data that is designated to be stored in a shared data store (e.g., log data, metric data, etc.). If, for example, the message includes log data and/or metric data, the service provider may store the log data and/or the metric data in a data store associated with the service provider. The service provider may access the data store at any time to perform various processing, such as identifying issues with a service the operates outside the service provider, evaluating an issue with a service that operates outside the service provider (e.g., troubleshooting problems), and so on.

In examples, the service provider may be implemented in the context of a cloud environment, such as by one or more servers in a cluster. Alternatively, or additionally, in examples, the service provider may be implemented outside a cloud environment.

In examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management, or any other type of wireless or wired network. Unless specifically described to the contrary, the techniques described herein are applicable to any communication network, control network, and/or another type of network or system. In one example, the techniques may be implemented in the context of the Internet of Things (IoT).

Example Environment

Figure 1:
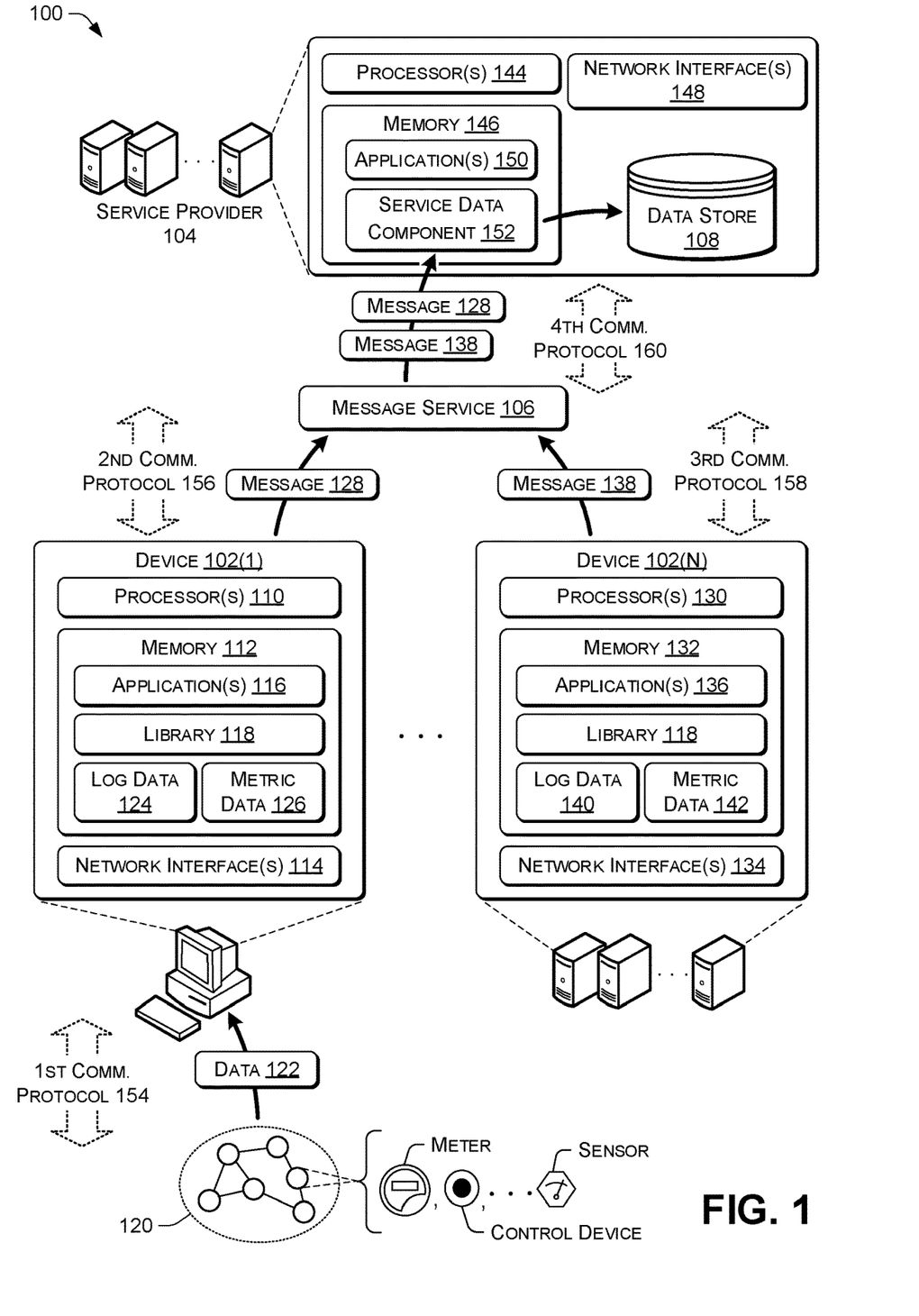
FIG. 1 is a diagram of an example environment in which the techniques discussed herein may be implemented.

FIG. 1 is a diagram illustrating an example environment or architecture 100. The architecture 100 includes a plurality of devices 102(1)-102(N) (collectively referred to as "the plurality of devices 102") configured to communicate with a service provider 104 via a message service 106, where N represents any integer greater than or equal to 1. For example, the plurality of devices 102 may send log data, metric data, or any other data to the service provider 104 for storage in a data store 108 associated with the service provider 104. The plurality of devices 102 and/or the service provider 104 may communicate with each other over one or more wireless or wired networks, such as a cellular network, a Local Area Network (LAN), a Wide Area Network (WAN), a backhaul network (e.g., the Internet), etc.

Each of the plurality of devices 102 may comprise one or more computing devices. In examples, the one or more computing devices include one or more desktop computers, one or more laptop computers, one or more servers, and the like. The one or more computing devices may be configured in a cluster, data center, cloud computing environment, or a combination thereof. In other examples, the one or more computing devices include other types of devices, such as a smart phone, an electronic reader device, a mobile handset, a personal digital assistant (PDA), a portable navigation device, a portable gaming device, a Virtual Reality (VR) device, a tablet computer, a wearable computer (e.g., a watch, an optical head-mounted display (OHMD), etc.), a portable media player, a television, a set-top box, a computer system in a car, an appliance, a camera, a robot, a hologram system, a security system, a home-based computer system (e.g., intercom system, home media system, etc.), a projector, an automated teller machine (ATM), and so on.

In examples, one or more of the plurality of devices 102 are located on-premises, such as at a central office where a utility is managed. Further, in examples, one or more of the plurality of devices 102 are located at other locations, such as remotely from a utility, at a data center, etc.

As illustrated in FIG. 1, the device 102(1) includes one or more processors 110, memory 112, and one or more network interfaces 114. The one or more processors 110 may include a central processing unit (CPU), a graphics processing unit (GPU), a microprocessor, a digital signal processor, and so on. The one or more network interfaces 114 may communicate with other devices in a wireless or wired manner, such as the service provider 104, another one of the plurality of devices 102, etc. The device 102(1) may be representative of each of the plurality of devices 102.

The memory 112 may store one or more applications 116 and a library 118. The one or more applications 116 may perform operations to facilitate one or more services, such as a utility service, a security service (e.g., to manage network security, such as an Authentication, Authorization and Accounting (AAA) service), a network registration service, a customer relationship management system (e.g., to manage sales and/or customer relationships), a diagnostic service (e.g., to diagnose one or more errors, such as in a manufacturing context), an inventory service (e.g., to manage inventory), a patient record service (e.g., to manage health care records), a billing service (e.g., to manage bills), and so on. In examples, a service is implemented as a web service, cloud service, local service (e.g., performed locally at a client device), etc.

In one example, such as that illustrated in FIG. 1, the one or more applications 116 are configured to implement at least a portion of a utility service. Here, the one or more applications 116 may communicate with network communication devices 120 to collect data 122 (e.g., resource consumption data regarding usage of water, gas, electricity, etc. at a meter), process the data 122 (perform local processing, in some cases), provide the data 122 to the service provider 104 (e.g., over a different channel than that illustrated in FIG. 1), and/or perform a variety of other operations. The service provider 104 may process the data 122, provide the data 122 or information/notifications regarding the processing to customers, utilities, or others, and/or perform a variety of other functionality. As such, the one or more applications 116 may operate in cooperation with the service provider 104 to implement a utility service. In examples, the one or more applications 116 may be implemented outside the environment of the service provider 104 to communicate with the network communication devices 120, which may operate according to a different communication protocol and/or different environment, as discussed in further detail below.

In any case, the device 102(1) may perform a service and generate service data regarding the service. The service data may comprise log data 124, metric data 126, and/or other data regarding events that occurred while performing the service. In examples, the log data 124 may include any informational messages that can be used to gain insight into the behavior of the service, or assist with troubleshooting of an issue, such as messages indicating an error (e.g., a processing error related to a particular message) that has occurred while performing the service, a time when data was received at the device 102(1) (e.g., resource consumption data from a network communication device), a time when the service was performed (e.g., a time when an operation started/ended), an exception that occurred while performing the service (e.g., an event that occurred that disrupts the normal flow of instructions), a time when an error or exception occurred, etc. In examples, the metric data 126 may include a number of different categories (e.g., counters, gauges, histograms, etc.) Counters may indicate a number of errors/exceptions that have occurred (e.g., total number, number over a period of time, average number, number while performing a specific operation, etc.), a number of operations (also referred to as transactions) that have been performed (e.g., total number, number over a period of time, average number, etc.), a frequency of errors/exceptions (e.g., more errors/exceptions over the past hour than the average per hour), etc. Gauges may include data similar to counters, but also include data that can increase or decrease, such as current central processing unit (CPU) usage. Histograms may include data related to latency, such as the time it takes to process a message. In examples, the metric data 126 is computed based on the log data 124. As such, the metric data 126 may indicate any metric related to performing a service.

In one example, in the context of the device 102(1) implementing a utility service, the device 102(1) may generate service data regarding performance of the utility service. In this example, the service data may indicate various information, such as an error/exception that occurred while receiving resource consumption data from the network communication devices 120, a time when resource consumption data was received, a number of errors/exceptions that occurred while performing the utility service, and so on.

Upon generating service data, the device 102(1) may use the library 118 to provide the log data 124, the metric data 126, and/or other data to the service provider 104. For example, the device 102(1) may use the library 118 to generate a message 128 for the log data 124 and/or the metric data 126 that is formatted for use by the service provider 104 (e.g., the device 102(1) may reformat/repackage the service data). To illustrate, the device 102(1) may reference the library 118 to determine how to structure the log data 124 and/or the metric data 126 within the message 128 in a format that is expected and/or usable by the service provider 104 (e.g., in a predetermined format). Additionally, or alternatively, the device 102(1) may use the library 118 to send the message 128 to the service provider 104. To illustrate, the device 102(1) may reference the library 118 to determine a function to call to send the message 128 to the service provider 104 (e.g., a particular service running within at the service provider 104).

In the example of FIG. 1, the device 102(1) may provide the message 128 to the service provider 104 via the message service 106. For example, the device 102(1) may send the message 128 to the message service 106, which may then forward on the message 128 to the service provider 104 at the appropriate time. In some examples, the service provider 104 may send a request to the message service 106 for the message 128 (e.g., pull the message 128 from the message service 106).

The message service 106 (sometimes referred to as a message bus) may act as an intermediary between the plurality of devices 102 and the service provider 104. The message service 106 may receive messages into a queue and/or provide the messages to the service provider 104 when requested (e.g., by the service provider 104), periodically, in a batched form, etc. The messages may be provided to the service provider 104 in a variety of manners, such as an order of receipt (e.g., First-In, First-Out (FIFO)), a reverse order (e.g., Last-In, First Out (LIFO)), and so on. In examples, the message service 106 is implemented as a cloud service. For example, the message service 106 may be implemented as a Message-Oriented Middleware (MOM), a message queuing service, etc. The message service 106 may be implemented by one or more computing devices, such as one or more servers, one or more laptop computers, one or more desktop computers, etc.

Each of the other devices of the plurality of devices 102 may implement similar techniques as the device 102(1) to provide log data, metric data, and/or other data to the service provider 104. For example, the device 102(N) may include one or more processors 130 (that are the same or similar to the one or more processors 110), memory 132, and one or more network interfaces 134 (that are the same or similar to the one or more network interfaces 114). The memory 132 may store one or more applications 136, which may be the same or similar to the one or more applications 116. The memory 132 may also store the library 118 (e.g., the same library that is stored in the device 102(1) or a modified version that includes more/less functions or objects). In general, the device 102(N) may generate service data regarding a service that is performed by the device 102(N) and send the service data to the service provider 104 in a message 138. The service data may include the log data 140 and/or the metric data 142.

The device 102(N) may implement the same service as the device 102(1) or a different service. In one example, the device 102(N) implements a utility service that includes communicating with one or more network communication devices, such as network communication devices in a separate network than the network communication devices 120. Here, the device 102(N) may be associated with a first utility entity (e.g., a first utility company) and the device 102(1) may be associated with a second utility entity (e.g., a second utility company). In another example, the device 102(1) and the device 102(N) operate in cooperation (e.g., in a cluster) to implement a service. Here, the device 102(1) and the device 102(N) may represent multiple devices (e.g., Virtual Machines (VMs)) in a cluster. In yet another example, the device 102(N) implements any of a variety of cloud services or other types of services. Although two devices are illustrated in FIG. 1, the plurality of devices 102 may include any number of devices that may perform separate or similar/same services.

The service provider 104 may be implemented as one or more computing devices, such as one or more desktop computers, laptop computers, servers, and the like. The one or more computing devices may be configured in a cluster, data center, cloud computing environment, or a combination thereof. In one example, the one or more computing devices provide cloud computing resources, including computational resources, network resources, storage resources, and the like, that operate remotely to the plurality of devices 102. To illustrate, the service provider 104 may implement a cloud computing platform/infrastructure for building, deploying, and/or managing applications and/or services. The service provider 104 may be physically located in a single central location or may be distributed at multiple different locations. In examples, the service provider 104 may be hosted privately by an entity administering all or part of a communications network (e.g., a utility company, a governmental body, a distributor, a retailer, a manufacturer, etc.), or may be hosted in a cloud environment, or a combination of privately hosted and cloud hosted services.

As illustrated, the service provider 104 includes one or more processors 144, memory 146, and one or more network interfaces 148. The one or more processors 144 may include a central processing unit (CPU), a graphics processing unit (GPU), a microprocessor, a digital signal processor, and so on. The one or more network interfaces 148 may communicate with other devices in a wireless or wired manner.

The memory 146 may store one or more applications 150 configured to implement a variety of functionality. For example, the one or more applications 150 may implement a utility service, a security service (e.g., to manage network security, such as an Authentication, Authorization and Accounting (AAA) service), a network registration service, a customer relationship management system (e.g., to manage sales and/or customer relationships), a diagnostic service (e.g., to diagnose one or more errors, such as in a manufacturing context), an inventory service (e.g., to manage inventory), a patient record service (e.g., to manage health care records), a billing service (e.g., to manage bills), and so on. The utility service may include one or more of these other services (e.g., the security service, the network registration service, the customer relationship management system, the diagnostic service, the billing service, etc.). In examples, a service is implemented as a web service, cloud service, etc. In examples, the service provider 104 may be referred to as a central agent (or central office service) that provides remote resources to network communication devices. Network communication devices may register or interact with some or all of these one or more central office services.

In one example, the one or more applications 150 may implement at least a portion of a utility service to manage one or more resources, such as gas, electricity, water, etc. In this example, the one or more applications 150 may collect resource consumption data originating from network communication devices, process the resource consumption data, provide information/notifications regarding resource consumption data to customers, utilities, and others, and/or perform a variety of other functionality. The one or more applications 150 may operate in cooperation with the one or more applications 116 and/or the one or more applications 136 to provide such functionality. In examples, resource consumption data may be stored at the service provider 104, such as in a separate data store than the data store 108 and/or in the data store 108. In examples, the one or more applications 150 collect resource consumption data through a separate channel than that used to collect service data. To illustrate, the one or more applications 150 may use a separate message service to receive resource consumption data from the plurality of devices 102 and a service data component 152 may use the message service 106 to receive service data from the plurality of devices 102.

The memory 146 may also store a service data component 152 configured to process messages from the plurality of devices 102. For instance, the service data component 152 may receive the message 128 from the message service 106 (or directly from the device 102(1)). In some examples, the service data component 152 may analyze the message 128 to determine if the message includes a predetermined type of data (e.g., log data, metric data, etc.), is formatted in a predetermined format, etc. If so, the service data component 152 may extract the service data from the message 128 (e.g., the log data 124 and/or the metric data 126) and publish the service data to the data store 108 (e.g., store the service data in the data store 108). In other examples, the service data component 152 may extract data from any messages that are routed to the service data component 152 and publish the data to the data store 108. Here, one of the plurality of devices 102 may use the library 118 to route a message to the service data component 152. The message may request that service data within the message be published to a central repository, such as the data store 108. Although illustrated as a software component, the service data component 152 may be implemented as a hardware component.

In examples, the one or more applications 150 may additionally, or alternatively, process service data to perform various tasks. In one example, the one or more applications 150 may process service data in real-time as the service data is received and/or stored. The one or more applications 150 may provide a notification to a customer, utility, administrator, entity, system, etc. when an event is detected, such as more than a threshold number of errors/exceptions occurring (e.g., over a period of time, total, etc.), and so on. In some instances, the notification may indicate that the error/exception occurred, a type of error/exception, a number of errors/exceptions that have occurred, etc. To illustrate, the notification may be provided to a utility with a message that an error has occurred at the device 102(1) (e.g., is not functioning properly). As such, the utility may evaluate the device 102(1) in real-time as the error is detected. In another example, the one or more applications 150 may process service data from the data store 108 to troubleshoot an issue with one of the plurality of devices 102. To illustrate, an issue may be identified with a particular device of the plurality of devices 102, and service data about the particular device may be accessed and analyzed to identify details about what caused the issue, when the issue started, etc. This may allow the issue to be resolved.

In examples, by implementing the techniques discussed herein to store service data in the data store 108, this may provide the service provider 104 with access to information that was otherwise not available. Further, this may reduce time and/or computing/network resources needed to retrieve service data (e.g., in comparison to cases where service data is distributed across multiple devices and/or located at devices that are subject to network restrictions).

Although the data store 108 is illustrated as being located at the service provider 104 in the example of FIG. 1, the data store 108 may be located at a same location as any one of the plurality of devices 102, in some examples.

In some examples, the service provider 104 is associated with an entity and the entity provides the library 118 and/or an application (e.g., to implement a utility service) to one or more of the plurality of devices 102.

The memory 112, the memory 132, and/or the memory 146 (as well as all other memory described herein) may include one or a combination of computer readable media. Computer readable media includes volatile and non-volatile, removable and non-removable media implemented in any method or technology for storage of information, such as computer readable instructions, data structures, program modules, or other data. Computer readable media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer readable media does not include communication media, such as modulated data signals and carrier waves. As such, computer readable media is non-transitory media.

As discussed above, in examples, the techniques are implemented in the context of the plurality of devices 102 communicating with one or more network communication devices (sometimes referred to as one or more nodes), such as the network communication devices 120. In some instances, the plurality of devices 102 may communicate with one or more network communication devices according to a first communication protocol 154 and may communicate with the message service 106 and according to a second communication protocol 156 and/or a third communication protocol 158. The message service 106 may communicate with the service provider 104 according to a fourth communication protocol 160. For instance, the first communication protocol 154, the second communication protocol 156 and/or the third communication protocol 158 may comprise a first Internet Protocol (IP) version that uses a first addressing format and the fourth communication protocol 160 may comprise a second IP version that uses a second addressing format. In one example, the first communication protocol 154, the second communication protocol 156 and/or the third communication protocol 158 comprise IPv6 and the fourth communication protocol 160 comprises IPv4. In another example, the first communication protocol 154, the second communication protocol 156 and/or the third communication protocol 158 comprise IPv4 and the fourth communication protocol 160 comprises IPv6. In yet other examples, the first communication protocol 154, the second communication protocol 156 and/or the third communication protocol 158 may comprise different addressing formats. In another example, the plurality of devices 102 and the service provider 104 may be associated with different networks and may include firewalls preventing the plurality of devices 102 from communicating with the service provider 104. In this case, the message service 106 may be used to provide the message 128 and the messages 138 to the service provider 104, regardless of which communication protocols are being utilized. In yet other examples, other types of communication protocols may be used. By using the plurality of devices 102 and the message service 106, the service provider 104 may receive data from devices that are compatible with different communication protocols or that are associated with different networks.

The plurality of devices 102, the message service 106, the service provider 104, and/or a network communication device may transmit and/or receive Protocol Data Units (PDUs). A PDU may comprise a bit, frame, packet, segment, or another unit of data. A PDU may include control data and/or payload data. As used herein, a message, transmission, communication, or the like may refer to any type of PDU.

Example Network Communication Device

Figure 2:
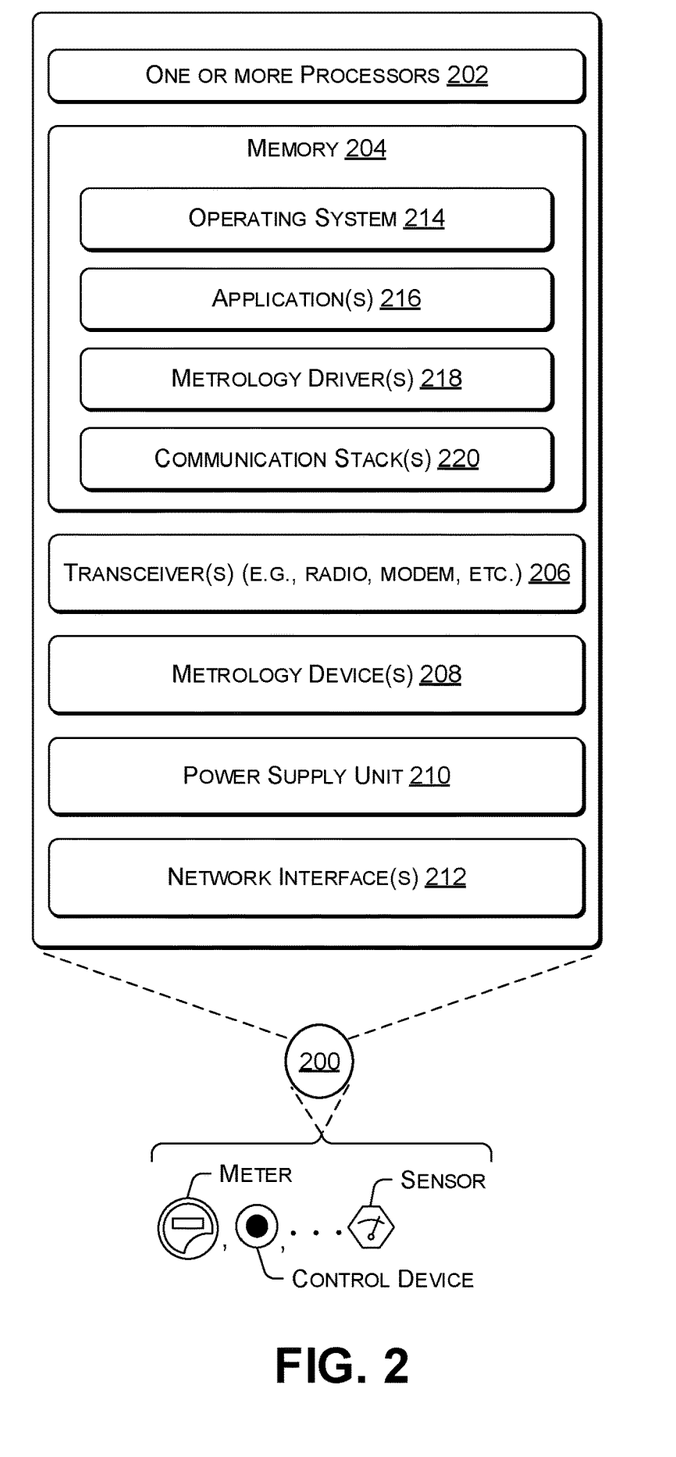
FIG. 2 is a diagram showing details of an example network communication device.

FIG. 2 is a diagram showing details of an example network communication device 200, such as any of the network communication devices 120 of FIG. 1. The network communication device may be a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, a computer systems in an automobile (e.g., navigation system), a camera, a robot, a hologram system, a security system, a home-based computer system (e.g., an intercom system, a home media system, etc.), a projector, an automated teller machine (ATM), and so on. In some examples, a network communication device is implemented as an edge device, such as a FAR, a cellular relay, a cellular router, an edge router, a DODAG (Destination Oriented Directed Acyclic Graph) root, a root device, and so on. In examples where a network communication device is associated with a utility (e.g., a router, a utility meter, a relay, a repeater, a transformer, a sensor, a switch, a control device, etc.), the network communication device may be referred to as a utility node.

The network communication device 200 may include one or more processors 202, memory 204, a transceiver 206 (e.g., radio, modem, etc.), one or more metrology devices 208, a power supply unit 210, and/or one or more network interfaces 212, etc. In examples, the memory 204 may store executable instructions that, when executed by the one or more processors 202, cause the one or more processors 202 to perform operations. Additionally, or alternatively, in some examples, some or all of the functions of the network communication device 200 may be performed by one or more hardware components (e.g., application specific integrated circuits, field programmable gate arrays, systems on a chip, and the like) to implement some or all of the functionalities.

The transceiver 206 may comprise one or more hardware and/or software implemented radios to provide two-way RF communication with other network communication devices in an AN or another network. The transceiver 206 may additionally, or alternatively, include a modem to provide power line communication (PLC) communication with other network communication devices that are connected to an electrical service grid.

The metrology device(s) 208 may comprise the physical hardware and sensors to measure consumption data of a resource (e.g., electricity, water, or gas) at a site of a meter. In the case of an electric meter, for example, the metrology device(s) 208 may include one or more Hall effect sensors, shunts, or the like. In the case of water and gas meters, the metrology device(s) 208 may comprise various flow meters, pressure sensors, or the like. The metrology device(s) 208 may report the consumption data to a service provider via the transceiver 206 and/or the one or more network interfaces 212.

The power supply unit 210 may provide power to the network communication device 200. In some instances, such as when the network communication device 200 is implemented as a Full Function Device (FFD), the power supply unit 210 comprises a mains power connector that couples to an Alternating Current (AC) or Direct Current (DC) mains power line where the network communication device 200 is installed. In other instances, such as when the network communication device 200 is implemented as a Limited Function Device (LFD), the power supply unit 210 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 204 includes an operating system (OS) 214 and one or more applications 216 that are executable by the one or more processors 202. The memory 204 may also include one or more metrology drivers 218 configured to receive, interpret, and/or otherwise process metrology data collected by the metrology device(s) 208. Additionally, or alternatively, the one or more applications 216 may be configured to receive and/or act on data collected by the metrology device(s) 208.

The memory 204 may also include one or more communication stacks 220. In some examples, the communication stack(s) 220 may be configured to implement a 6LowPAN protocol, an 802.15.4e (TDMA CSM/CA) protocol, an 802.15.4-2015 protocol, IPv6, IPv4, and/or another protocol. However, in other examples, other protocols may be used, depending on the networks with which the network communication device 200 is intended to be compatible. The communication stack(s) 220 describe the functionality and rules governing how the network communication device 200 interacts with each of the specified types of networks. For instance, the communication stack(s) 220 may cause the network communication device 200 to operate in ways that minimize the battery consumption of the network communication device 200 when it is connected to these types of networks.

In some instances, the network communication device 200 comprises a Limited Function Device (LFD), while in other instances the network communication device 200 comprises a Full Function Device (FFD). An FFD may include more functionality/resources than an LFD, such as different processing powers, processing capabilities, power reliance, etc. In one example, an FFD is implemented as Mains Powered Device (MPD) that is connected to mains electricity (e.g., electricity meters), while an LFD is implemented as a Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life.

While FFDs and LFDs may have the similar components, the components may differ due to the different constraints. As one example, while both an FFD and an LFD have transceivers, the specific transceivers used may be different. For instance, a transceiver on an FFD may include a PLC modem, while a transceiver on an LFD may not because it is not connected to an electrical power line that could be used for PLC communications. Additionally, or alternatively, a transceiver on an LFD may employ a lower power RF radio than and FFD to minimize energy consumption. Further, other components of the FFDs and LFDs may vary. In some instances, an LFD is implemented with less functionality and/or include less hardware components than an FFD. Further, in some instances components of an LFD are lower power components than the corresponding components of an FFD.

In examples, a plurality of network communication devices may be configured in an area network. The term "Area Network" (AN) may refer to a defined group of devices that are in communication with one another via one or more wired or wireless links. Examples of ANs include, for example, Local Area Networks (LANs), Wide Area Networks (WANs), Neighborhood Area Networks (NANs), Personal Area Networks (PANs), Home Area Networks (HANs), Field Area Networks (FANs), and so on. In some instances, multiple ANs exist and collectively define a larger network, such as an advanced metering infrastructure (AMI) of a utility communication network. In examples, an AN may be configured in a star or mesh arrangement. In general, a network communication device is a member of a particular AN. Although in some instances, a network communication device may be a member of multiple ANs. Further, over time, network communication devices may migrate from one AN to another geographically proximate or overlapping AN based on a variety of factors, such as respective loads on the ANs, battery reserves, interference, or the like.

The term "link" may refer to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels. An AN may implement a channel hopping sequence, such that a channel may change over time.

Example Processes

Figure 3A:
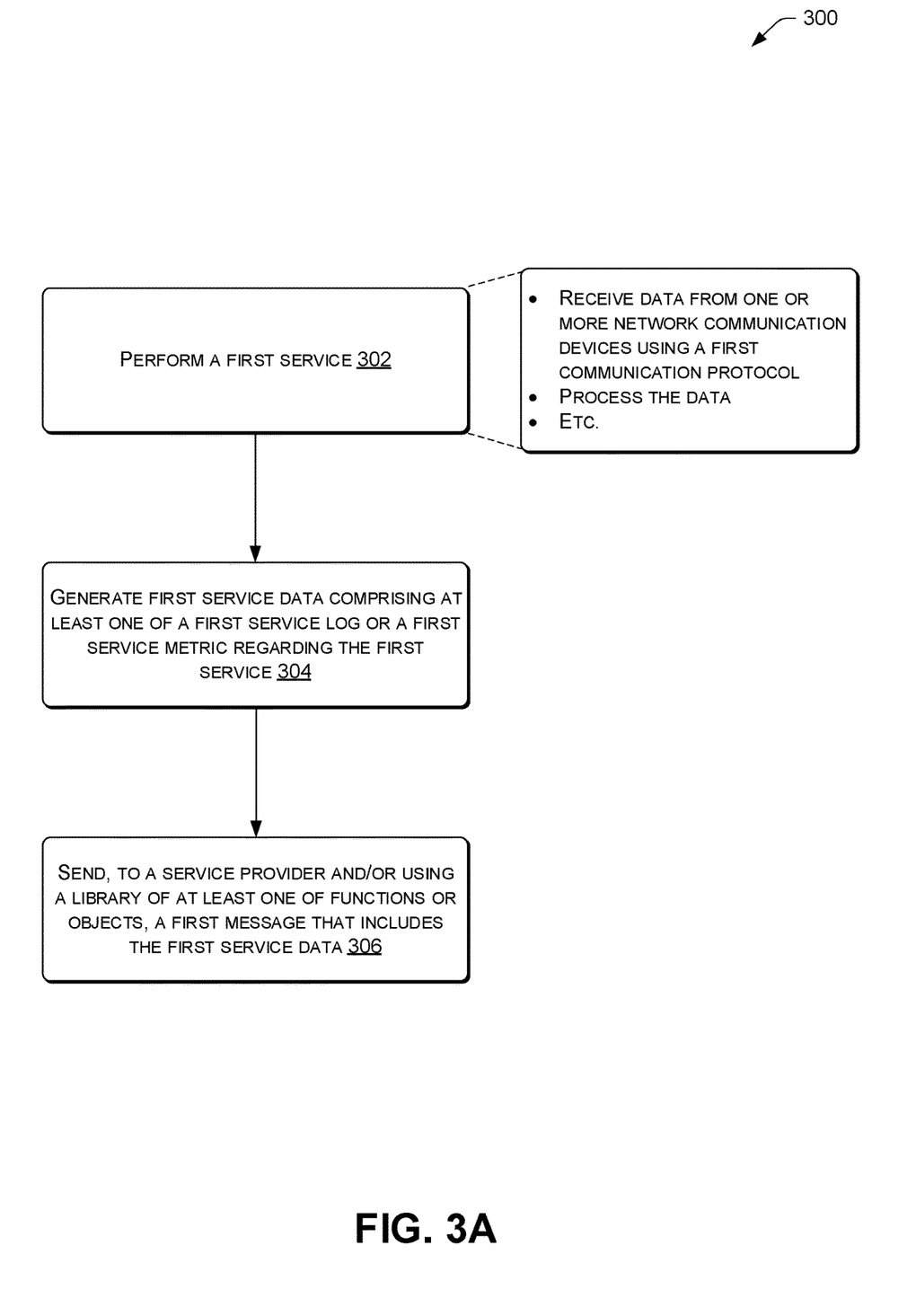
FIGS. 3A-3B illustrate an example process for providing service data generated at multiple devices to a service provider.
Figure 3B:
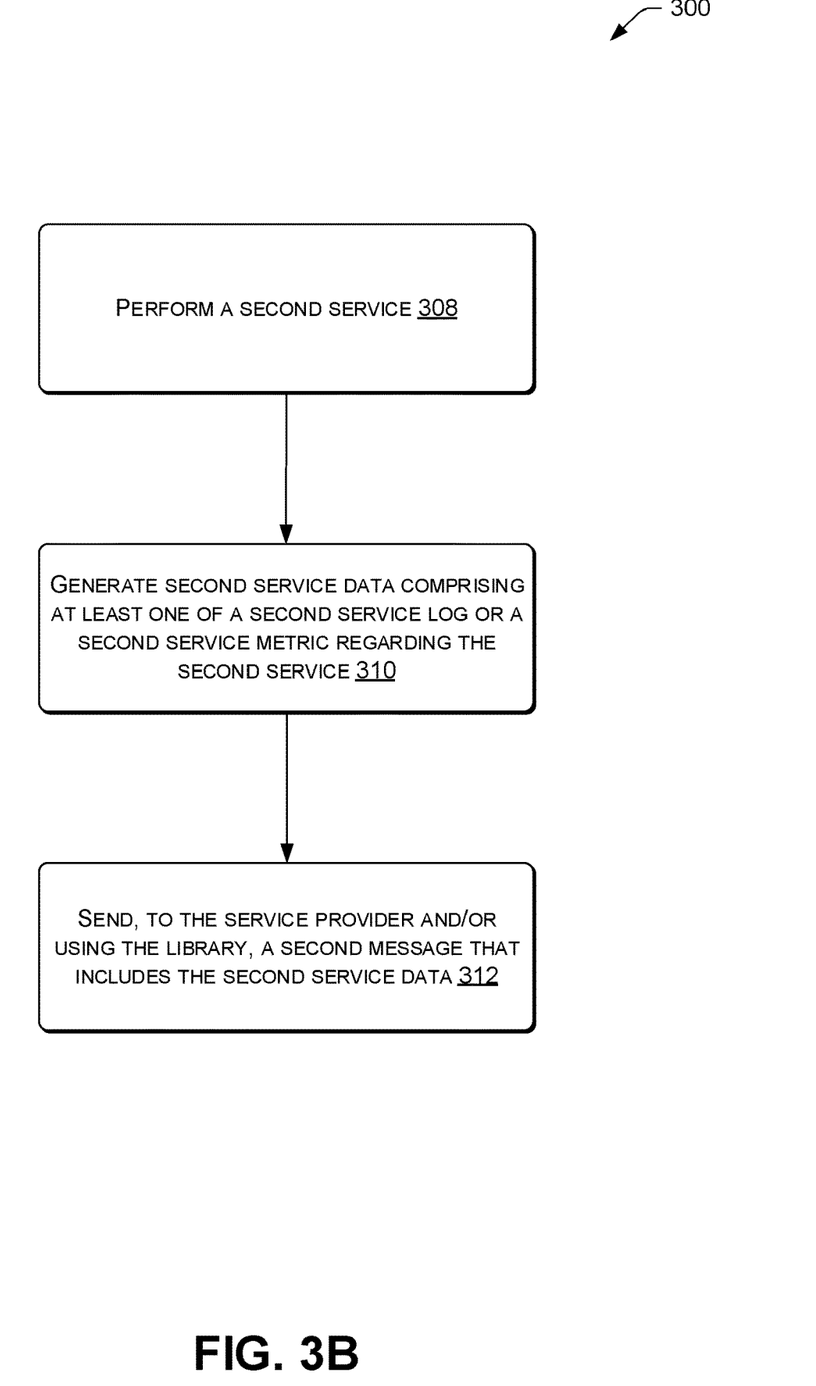
Figure 4:
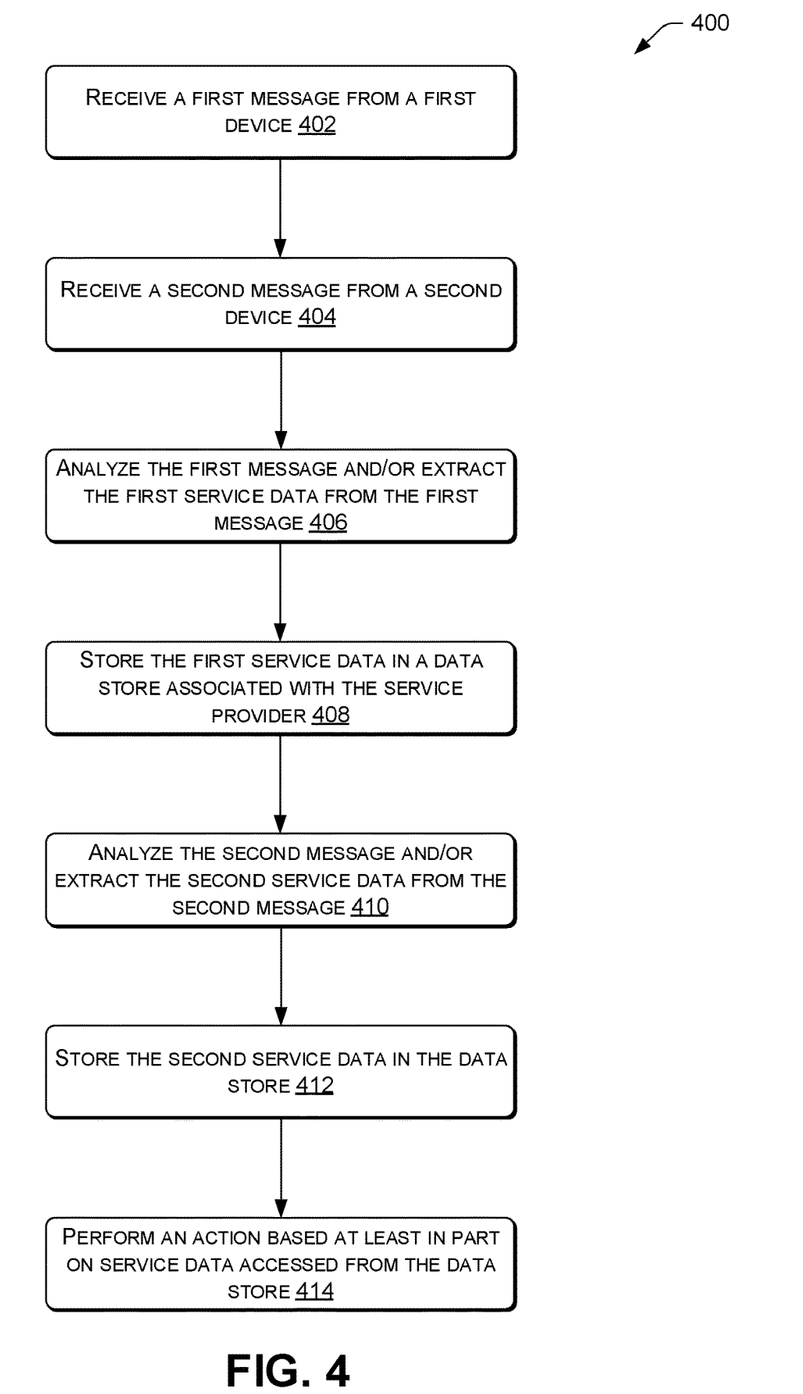
FIG. 4 illustrates an example process to receive service log data from one or more devices and publish the service log data to a data store.

FIGS. 3A-3B illustrate an example process 300 for employing techniques discussed herein and FIG. 4 illustrates an example process 400 for employing techniques discussed herein. The processes 300 and 400 (as well as each process described herein) are illustrated as logical flow graphs, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

FIGS. 3A-3B illustrate the example process 300 for providing service data generated at multiple devices to a service provider. In examples, a device(s) may include an application(s) that, when executed by one or more processors of the device(s), cause the one or more processors to perform the process 300. As discussed below, at least some operations of the process may be performed by a first device (e.g., the device 102(1) of FIG. 1) and at least some other operations of the process 300 may be performed by a second device (e.g., the device 102(N) of FIG. 1). However, the process 300 may be performed by any number of devices and/or other devices (e.g., the service provider 104 in FIG. 1, in some cases).

In FIG. 3A, at 302, the first device may perform a first service. In examples, the first service may be based at least in part on a first communication protocol. For example, the first service may include receiving data from one or more network communication devices using a first communication protocol (e.g., receive resource consumption from a utility node(s) using the first communication protocol). Additionally, or alternatively, the first service may include processing the data that is received (e.g., evaluating consumption of a resource based on resource consumption data, identifying a leak or potential issue for consumption of more than a threshold amount of water/electricity/gas, etc.), and so on.

At 304, the first device may generate first service data comprising at least one of a first service log or a first service metric regarding the first service. The first service data may indicate one or more events that have occurred while performing the first service. To illustrate, a first service log may indicate at least one of an error that occurred while performing the first service, a time when resource consumption data was received, a time when the first service was performed, an exception that occurred while performing the first service, and so on. Further, to illustrate a metric, a first service metric may indicate at least one of a number of errors that have occurred for the first service, a number of transactions (e.g., operations) that have been performed by the first service, and so on.

At 306, the first device may send, to a service provider and/or using a library of at least one of functions or objects, a first message that includes the first service data. The library may define how to communicate with the service provider (e.g., a particular service within the service provider to send service data to). In examples, the first message may be sent to the service provider via a message service according to (e.g., the first message is sent to the message service, which forwards the first message onto the service provider or receives a request from the service provider to send the first message when the service provider is ready to process the first message). Further, in examples, the first message may be sent to the message service based at least in part on a second communication protocol and the message service may send the first message to the service provider has at least in part on a third communication protocol. In examples, the first and second communication protocols may comprise a first Internet Protocol (IP) version (e.g., IPv4, IPv6, etc.) that uses a first addressing format and the third communication protocol may comprise a second IP version (e.g., IPv6, IPv4, etc.) that uses a second addressing format. The third communication protocol may be compatible with the message service and/or the service provider. In some examples, the first, second, and third communication protocols may be the same, but the first device and the service provider may be associated with separate and different networks which include firewalls. In the case, the message service may be utilized to forward the first message onto the service provider or receive a request from the service provider to send the first message when the service provider is ready to process the first message.

In FIG. 3B, at 308, a second device may perform a second service. In examples, the second service may be based at least in part on the first communication protocol and/or a fourth communication protocol. The second service may include at least a portion of the first service and/or a third service. In one example, the first device may comprise a first server instance (e.g., Virtual Machine (VM)) to perform the first service and the second device may comprise a second server instance to operate with the first servicer instance to perform the first service. In another example, the first device is associated with a first utility entity (e.g., company) and the second device is associated with a second utility entity. In examples, the first device and/or the second device are located remotely from the service provider.

In one illustration, the second service may include receiving, using the first communication protocol, additional resource consumption data from one or more additional utility nodes. Additionally, or alternatively, the second service may include processing the additional resource consumption data.

At 310, the second device may generate second service data comprising at least one of a second service log or a second service metric regarding the second service. To illustrate, a second service log may indicate at least one of an error that occurred while performing the second service, a time when resource consumption data was received, a time when the second service was performed, an exception that occurred while performing the second service, and so on. Further, to illustrate, a second service metric may indicate at least one of a number of errors that have occurred for the second service, a number of transactions that have been performed by the second service, and so on.

At 312, the second device may send, to the service provider and/or using the library, a second message that includes the second service data. The library may be the same as the library used by the first device (or a different library, in some cases). In examples, the second message may be sent to the service provider via the message service. Further, in examples, the second message may be sent based at least in part on a fourth communication protocol that may be the same or may be different than the second communication protocol.

In some examples, any of operations 302-306 may be performed in parallel with any of operations 308-312. In other examples, operations 302-312 may be performed sequentially as shown. In yet other examples, operations 302-312 may be performed in another order.

FIG. 4 illustrates the example process 400 to receive service log data from one or more devices and publish the service log data to a data store. In examples, the process 400 is performed by a service provider (e.g., the service provider 104 in FIG. 1). Although the process 400 may be performed by other devices (e.g., any of the plurality of devices 102, etc.).

At 402, the service provider may receive a first message from a first device. The first message may include first service data comprising a first service log and/or a first service metric regarding a first service performed by the first device. In examples, the first message may be received through a message service that communicates with the service provider based on a first communication protocol. Further, in examples, the first communication protocol may be different than a second communication protocol that the first device uses to communicate with other devices (e.g., a second communication protocol that is used to perform the first service).

At 404, the service provider may receive a second message from a second device. The second message may include second service data comprising a second service log and/or a second service metric regarding a second service performed by the second device. In examples, the second message may be received through the message service that communicates with the service provider based on the first communication protocol. Further, in examples, the first communication protocol may be different than a third communication protocol that the second device uses to communicate with other devices (e.g., a third communication protocol that is used to perform the second service).

At 406, the service provider may analyze the first message and/or extract the first service data from the first message. For example, the service provider may analyze the first message to determine that the first message includes a predetermined type of data (e.g., service data). The service provider may then extract the first service data. In some examples, the service provider may extract the first service data without performing an analysis.

At 408, the service provider may store (e.g., publish) the first service data in a data store associated with the service provider.

At 410, the service provider may analyze the second message and/or extract the second service data from the second message. For example, the service provider may analyze the second message to determine that the second message includes a predetermined type of data (e.g., service data). The service provider may then extract the second service data. In some examples, the service provider may extract the second service data without performing an analysis.

At 412, the service provider may store (e.g., publish) the second service data in the data store associated with the service provider.

At 414, the service provider may perform an action based at least in part on service data accessed from the data store. In one example, the service provider may access the first service data from the data store, process the first service data (e.g., to determine if an error/exception has occurred at a device, determine what caused an error/exception, etc.), and/or provide information regarding the processing (e.g., a notification to a customer, administrator, system, etc. regarding an error/exception). In examples, the processing may be performed in real-time as the service data is received and/or stored.

What is claimed is:

1. A system comprising:
   a first application executable by one or more first processors of a first device operated by a first utility service provider to:
      perform a first service, the first service comprising at least one of:
         receiving, using a first communication protocol, resource consumption data from one or more utility nodes; or
         processing the resource consumption data;
      generate first service data comprising at least one of a first service log or a first service metric regarding the first service; and
      send, to a message service and using a library of at least one of functions or objects, a first message that includes the first service data, the first message being sent based at least in part on a second communication protocol;
   a second application executable by one or more second processors of a second device operated by a second utility service provider to:
      perform a second service;
      generate second service data comprising at least one of a second service log or a second service metric regarding the second service; and
      send, to the message service and using the library, a second message that includes the second service data, the second message being sent based at least in part on a third communication protocol; and
   a service provider comprising one or more third processors and memory storing executable instructions that, when executed by the one or more third processors, cause the one or more third processors to:
      receive, based at least in part on a fourth communication protocol, the first message from the message service;
      analyze the first message to determine that the first message includes a predetermined type of data including at least one of log data or metric data;
      receive, based at least in part on the fourth communication protocol, the second message from the message service;
      analyze the second message to determine that the second message includes the predetermined type of data;
      extract the first service data from the first message in response to determining that the first message includes the predetermined type of data;
      publish the first service data to a data store associated with the service provider;
      extract the second service data from the second message in response to determining that the second message includes the predetermined type of data; and
      publish the second service data to the data store.

2. The system of claim 1, wherein the first communication protocol comprises a first Internet Protocol (IP) version that uses a first addressing format and the fourth communication protocol comprises a second IP version that uses a second addressing format.

3. The system of claim 1, wherein the first service data comprises the first service log indicating at least one of an error that occurred while performing the first service, a time when the resource consumption data was received, a time when the first service was performed, or an exception that occurred while performing the first service.

4. The system of claim 1, wherein the first service data comprises the first service metric, and the memory of the service provider stores further executable instructions that, when executed by the one or more third processors, cause the one or more third processors to:
   process the first service data in substantially real-time as the first service data is received; and
   provide a notification regarding performance of the first service at the first device.

5. A system comprising:
   one or more processors; and
   memory communicatively coupled to the one or more processors and storing executable instructions that, when executed by the one or more processors, cause the one or more processors to perform operations comprising:
      receiving, using a first communication protocol, first service data from a message service, the first service data comprising at least one of a first service log or a first service metric regarding a first service performed by a first remote device operated by a first utility service provider, the first service being associated with a second communication protocol;
      receiving, using the first communication protocol, second service data from the message service, the second service data comprising at least one of a second service log or a second service metric regarding a second service performed by a second remote device operated by a second utility service provider;
      determining that the first service data includes a predetermined type of data and a predetermined type of format;
      determining that the second service data includes the predetermined type of data and the predetermined type of format;
      storing the first service data in a data store associated with the system in response to determining that the first service data includes the predetermined type of data and the predetermined type of format;
      storing the second service data in the data store in response to determining that the second service data includes the predetermined type of data and the predetermined type of format; and
      performing an action based on at least one of the first service data or the second service data that is stored in the data store.

6. The system of claim 5, wherein the system is associated with a first network and at least one of the first remote device or the second remote device is associated with a second network that is different than the first network.

7. The system of claim 5, wherein the first service data comprises the first service log indicating at least one of an error that occurred while performing the first service, a time when resource consumption data was received, a time when the first service was performed, or an exception that occurred while performing the first service.

8. The system of claim 5, wherein the first service data comprises the first service metric, the first service metric indicating at least one of a number of errors that have occurred for the first service or a number of transactions that have been performed by the first service.

9. The system of claim 5, wherein the action comprises at least one of:
   processing the first service data in substantially real-time as the first service data is received; or
   providing a notification regarding performance of the first service at the first remote device.

10. The system of claim 5, further comprising:
   the first remote device to:
      perform the first service, the first service comprising at least one of:
         receiving, using the second communication protocol, resource consumption data from one or more utility nodes; or
         processing the resource consumption data;
      generate at least one of the first service log or the first service metric regarding the first service; and
      send, using a library of at least one of functions or objects, a first message to the system, the first message including at least one of the first service log or the first service metric.

11. The system of claim 10, further comprising:
   the second remote device to:
      perform the second service;
      generate at least one of the second service log or the second service metric regarding the second service; and
      send, using the library, a second message to the system, the second message including at least one of the second service log or the second service metric.

12. The system of claim 11, wherein the second service comprises at least one of:
   receiving, using the second communication protocol, additional resource consumption data from one or more additional utility nodes; or
   processing the additional resource consumption data.

13. The system of claim 5, wherein the first remote device is associated with a first utility entity and the second remote device is associated with a second utility entity.

14. A method comprising:
   performing, by a first utility operated device and based at least in part on a first communication protocol, a first service related to resource consumption data associated with a first utility resource type;
   generating, by the first utility operated device, first service data comprising at least one of a first service log or a first service metric regarding one or more events that have occurred while performing the first service;
   sending, by the first utility operated device and using a library of at least one of functions or objects, a first message that includes the first service data to a message service;
   performing, by a second utility operated device and based at least in part on the first communication protocol, a second service, the second service being associated with a second utility resource type and comprising at least one of a third service or a portion of the first service;
   generating, by the second utility operated device, second service data comprising at least one of a second service log or a second service metric regarding the second service;
   sending, by the second utility operated device and using the library, a second message that includes the second service data to the message service;
   receiving, by a service provider that includes one or more processors and based at least in part on a second communication protocol, the first message from the message service;
   analyzing the first message to determine that the first message includes a predetermined type of data including at least one of log data or metric data;
   receiving, by the service provider and based at least in part on the second communication protocol, the second message from the message service;
   analyzing the second message to determine that the second message includes the predetermined type of data; and
   storing, by the service provider, the first service data and the second service data in a data store associated with the service provider based at least in part on determining that the first message and the second message include the predetermined type of data.

15. The method of claim 14, wherein the first utility operated device comprises a first server instance associated with the first service and the second utility operated device comprises a second server instance associated with the first service.

16. The method of claim 14, wherein the first utility operated device and the second utility operated device each comprise a device located remotely from the service provider.

17. The method of claim 14, wherein the service provider is associated with a first network and at least one of the first utility operated device or the second utility operated device is associated with a second network that is different than the first network and wherein receiving at least one of the first message or the second message includes bypassing a firewall associated with at least one of the first network or the second network.

18. The method of claim 14, further comprising:
   processing, by the service provider, the first service data in substantially real-time as the first service data is received; and
   providing, by the service provider, a notification regarding performance of the first service at the first utility operated device.

19. The method of claim 14, further comprising:
   accessing, by the service provider, the first service data from the data store;
   processing, by the service provider, the first service data to evaluate an error that has occurred at the first utility operated device; and
   providing, by the service provider, information regarding the processing.

20. The system of claim 1, wherein at least one of the first message or the second message includes a request to be published to a central repository of the data store.

* * * * *